United States Patent [19]

Eguchi

[11] Patent Number: 5,369,272
[45] Date of Patent: Nov. 29, 1994

[54] LASER BEAM SCANNING APPARATUS HAVING BEAM INTENSITY CONTROL

[75] Inventor: Tatsuya Eguchi, Toyohashi, Japan
[73] Assignee: Minolta Camera Co., Ltd., Osaka, Japan
[21] Appl. No.: 50,836
[22] Filed: Apr. 21, 1993
[30] Foreign Application Priority Data Apr. 24, 1992 [JP] Japan .................................. 4-131891

[51] Int. Cl.$^5$ ............................................ H01J 3/14
[52] U.S. Cl. .................................... 250/235; 250/205
[58] Field of Search ................... 250/205, 235, 236; 359/218, 219; 358/481

[56] References Cited

U.S. PATENT DOCUMENTS

| 4,201,994 | 5/1980 | Hoshito et al. |
|---|---|---|
| 4,625,315 | 11/1986 | Lemberger et al. |
| 4,713,672 | 12/1987 | Horihata et al. |
| 4,763,334 | 8/1988 | Shimada et al. |
| 4,827,481 | 5/1989 | Sasaki |
| 4,862,466 | 8/1989 | Eguchi |
| 5,130,524 | 7/1992 | Egawa et al. .................. 250/205 |

Primary Examiner—David C. Nelms
Assistant Examiner—K. Shami
Attorney, Agent, or Firm—Price, Gess & Ubell

[57] ABSTRACT

A laser beam scanning apparatus provided with a first photosensor for detecting a laser beam which has passed through an optical member and a second photosensor for detecting the laser beam without passing through the optical member to prevent the breakage of the laser beam emitting source. The intensity of the laser beam is controlled on the basis of the output signal from the first photosensor and moreover, the supply of power to a laser beam emitting source is stopped when a difference between the intensities of the laser beam detected by the first and second photosensors exceeds a predetermined value due to any contamination of the optical member.

18 Claims, 6 Drawing Sheets

LASER BEAM SCANNING APPARATUS HAVING BEAM INTENSITY CONTROL

BACKGROUND OF THE INVENTION

1. Field of the Invention

This invention relates to a laser beam scanning apparatus to be used in a laser applied apparatus such as a laser beam printer, a laser COM (Computer Output Microfilming) system or the like.

2. Description of the Related Art

The laser beam printer or the laser COM system which uses laser beams emitted from a laser beam emitting source, records images by laser beams directly modulated on the basis of the image data.

Accordingly, it is necessary to stabilize the laser beam emission at all times so as to record images faithful to the image data. However, the emission from the laser beam emitting source is easily influenced by temperatures and the intensity changes owing to the deterioration of the emitting source itself. Moreover, even if the intensity itself does not change, the intensity on a beam receiving surface can be changed by any contamination of the optical system, thus making it difficult to obtain a proper image.

Conventionally, in order to deal with the change in the emission from the laser beam emitting source, the intensity of the laser beams is controlled to be constant on the basis of the output from a photosensor which detects the laser beams from the laser beam emitting source (Auto Power Control: APC).

Moreover, an apparatus is disclosed in U.S. Pat. No. 4,201,994, to correct a laser beam intensity on the basis of the output from a photosensor which detects the laser beam passed through the optical system in order to meet the lowering of the laser beam intensity at the beam receiving surface due to the contamination of the optical system.

In the case where the photosensor is provided to detect the laser beam which has passed through the scanning optical system, the intensity of the laser beams reaching the photosensor considerably decreases if the scanning optical system is excessively contaminated. In consequence, the output from the photosensor works as a signal to increase the laser beam intensity, which may cause an excessive supply of power to the laser beam emitting source and may eventually break the laser beam emitting source.

SUMMARY OF THE INVENTION

This invention has been devised to solve the aforementioned drawbacks, and has for its object to provide a laser beam scanning apparatus which secures the appropriate power by controlling a laser beam emitting source in accordance with the lowering in the intensity of the laser beam onto a photosensitive drum through an optical system but prevents the breakage of a laser beam emitting source by stopping the supply of power to the laser beam emitting source when the emission intensity from the laser beam emitting source becomes excessive.

The above and further objects add features of the invention will more fully be apparent from the following detailed description with accompanying drawings.

DESCRIPTION OF THE PREFERRED EMBODIMENTS

This invention will be discussed in detail hereinafter in conjunction with preferred embodiments thereof with reference to the drawings.

Figure 1:
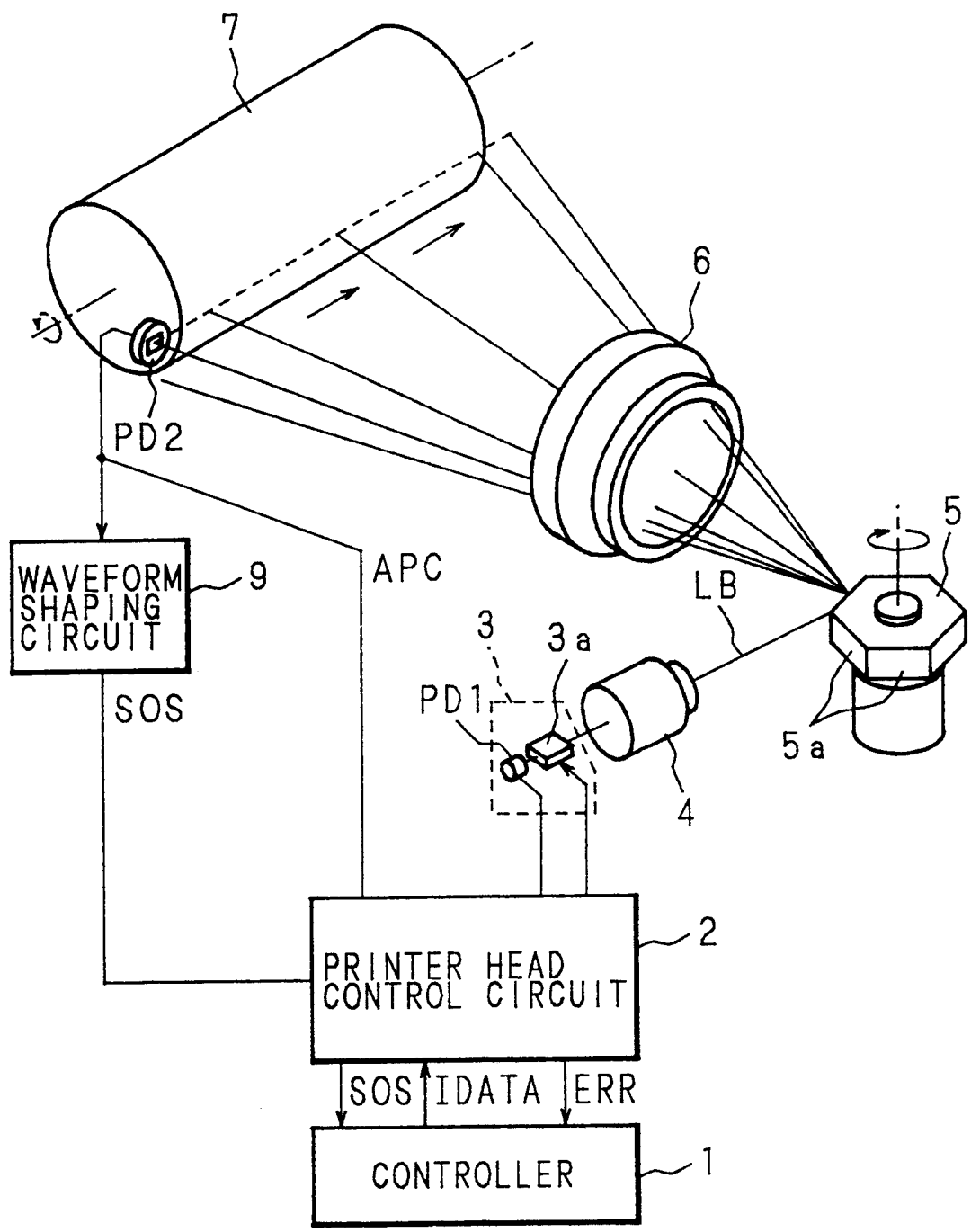
FIG. 1 is a diagram of a laser beam scanning apparatus according to this invention.

FIG. 1 is a diagram of a laser beam printer provided with a laser beam scanning apparatus of this invention. In the laser beam printer, an image data IDATA to be recorded is read out from an image memory in a controller 1 and inputted to a printer head control circuit 2. The printer head control circuit 2 supplies an exciting current to a semiconductor laser 3a in a laser head 3 based on the image data IDATA. The semiconductor laser 3a emits a laser beam LB directly modulated by the exciting current.

In the laser head 3, a photosensor PD1 is provided to directly receive the laser beam LB emitted from the rear of the semiconductor laser 3a, that is, the laser beam LB not passing through the other optical member. The photosensor PD1 directly detects the laser beam LB emitted from the semiconductor laser 3a and the detected result is inputted to the printer head control circuit 2, so that the control circuit 2 finds the present state of the emission intensity of the semiconductor laser 3a.

The laser beam LB emitted from the semiconductor laser 3a is collimated by a collimator lens 4 and reflected by each reflecting surface 5a of a polygon mirror 5 in high speed rotation. The laser beam LB reflected by one reflecting surface is condensed by an fθ lens 6 onto a photosensitive drum 7 having a uniformly charged surface, thereby attenuating a charge potential at an image forming position according to the intensity of the beam.

The laser beam LB scans the photosensitive drum 7 longitudinally (which constitutes a main scanning direction) as the polygon mirror 5 rotates. Meanwhile, the photosensitive drum 7 rotates at a constant speed (the rotating direction constitutes an auxiliary scanning direction). As the laser beam LB repeatedly scans the photosensitive drum 7 in rotation, an electrostatic latent image corresponding to the image data IDATA is formed on the photosensitive drum 7.

After coloring pigments as toners are selectively adhered to the electrostatic latent image to develop the image, a recording paper is placed in tight contact with the drum surface carrying the face of toners, so that the toners are transferred onto the paper. The toners are fused by heat and fixed to the recording paper, thus obtaining an image output.

A photosensor PD2 is disposed in the upper stream of the photosensitive drum 7 with respect to the main scanning direction. The photosensor PD2 receives the laser beam LB passed through the optical system and outputs a photoelectric current. The output from the photosensor PD2 is inputted directly to the printer head control circuit 2 as a laser beam power control signal (APC) and indirectly to the printer head control circuit 2 as a synchronizing signal (SOS) after being shaped by a waveform shaping circuit 9.

The printer head control circuit 2 calculates an exciting current based on the laser beam power control signal APC inputted per every scanning, namely, per every line so that the laser beam power becomes a value necessary at the photosensitive drum 7, and supplies the exciting current to the semiconductor laser 3a. The printer head control circuit 2 outputs the synchronizing signal from the photosensor PD2 to the controller 1. In response to the synchronizing signal SOS from the printer head control circuit 2, the controller 1 outputs the image data IDATA of one line from the image memory after a time necessary for the laser beam LB to reach the recording start position on the photosensitive drum 7 from the position of the photosensor PD2. The printer head control circuit 2 modulates the exciting current supplied to the semiconductor laser 3a, on the basis of the image data IDATA. Accordingly, the laser beam LB is modulated based on the image data IDATA.

By means of starting the modulation of the laser beam LB upon receipt of the synchronizing signal SOS, the recording start position of the main scanning direction is aligned in the auxiliary scanning direction. In this manner, a jitter resulting from the manufacturing error or the irregular rotation of the polygon mirror is prevented.

Figure 2:
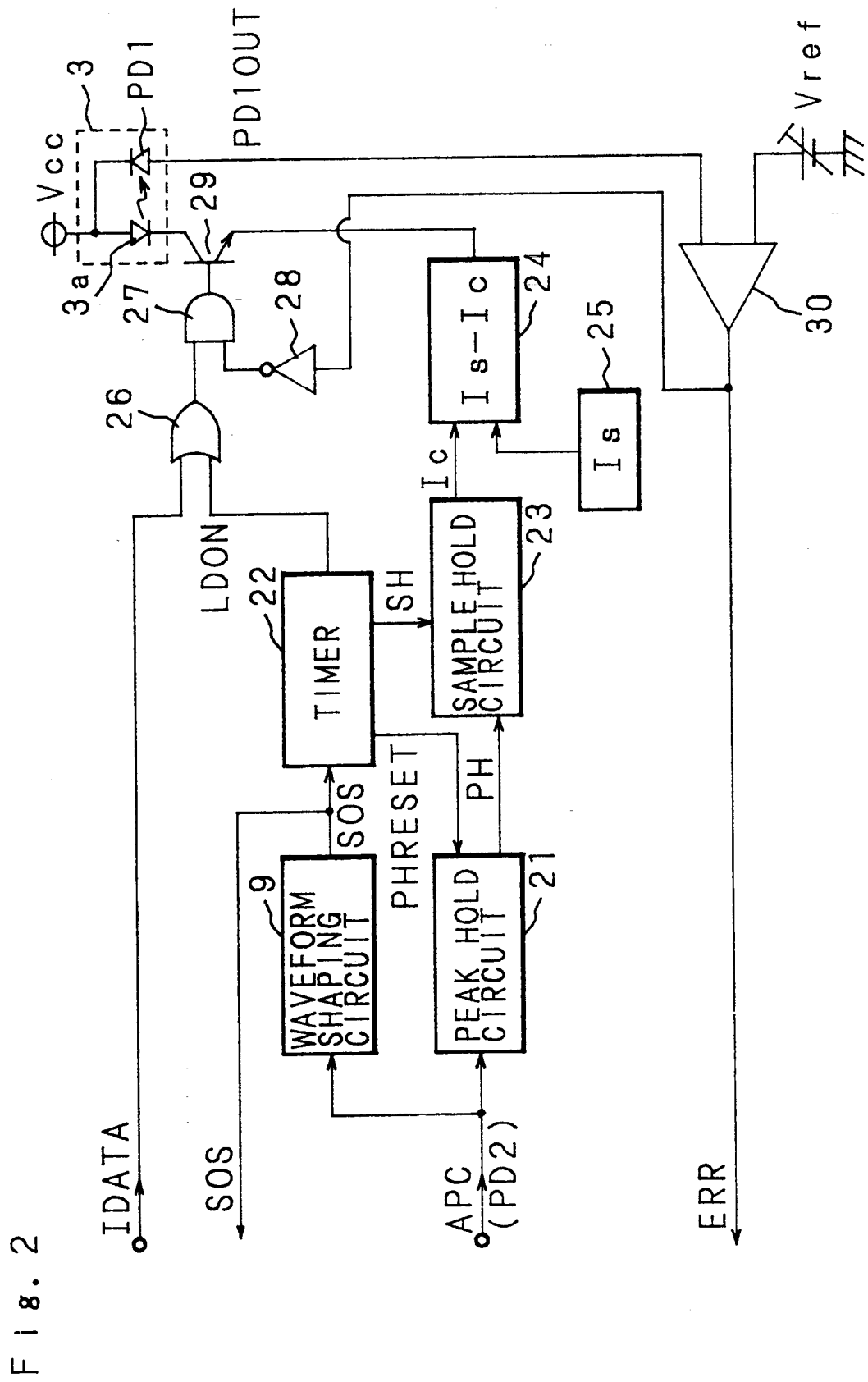
FIG. 2 is a detailed block diagram of a printer head driving circuit of FIG. 1.

FIG. 2 is a block diagram indicating a schematic structure of the printer head control circuit 2. The signal APC from the photosensor PD2 is inputted to a peak hold circuit 21, and the synchronizing signal from the waveform shaping circuit 9 is inputted to both a timer 22 and the controller 1. The timer 22 generates three pulse signals, PHRESET, SH, LDON in response to the synchronizing signal SOS. Each of these pulse signals with a predetermined pulse width is outputted immediately after the synchronizing signal SOS falls or is outputted when a predetermined time has passed after the signal SOS falls.

An output PH from the peak hold circuit 21 is sampled and held by a sample hold circuit 23, and an output Ic from the sample hold circuit 23 is outputted to a subtracter 24. The pulse signal PHRESET from the timer 22 resets the peak hold circuit 21, while the pulse signal Sh gives the timing for the sample hold circuit 23 to sample and hold the output.

The subtracter 24 calculates a difference between the output Ic from the sample hold circuit 23 and an output Is from a constant current source 25 (Is-Ic), and supplies a corresponding current to the semiconductor laser 3a via a switching transistor 29.

The image data IDATA is inputted to one input terminal of an OR gate 26, while the pulse signal LDON from the timer 22 is inputted to the other input terminal thereof. The pulse signal LDON turns ON the semiconductor laser 3a at a timing when the photosensor PD2 receives the laser beam. An output terminal of the OR gate 26 is connected to one input terminal of an AND gate 27, and the other input terminal of the AND gate 27 is connected with an output, terminal of a comparator 30 via an inverter 28.

An output terminal of the AND gate 27 is connected to a base of the switching transistor 29. A collector of the switching transistor 29 is connected to the laser head 3, while an emitter thereof is connected to the subtracter 24. The laser head 3 includes the semiconductor laser 3a and photosensor PD1. A source voltage Vcc is applied to the semiconductor laser 3a. The laser beam emitted from the semiconductor laser 3a is not only received by the photosensor PD1, but projected to the polygon mirror 5 as indicated in FIG. 1.

The detection value PD1OUT of the photosensor PD1 is inputted to the comparator 30 and compared with a reference voltage Vref which is inputted to the other input terminal of the comparator. When the detection value PD1OUT is lower than the reference voltage Vref, an error signal ERR becomes a low level and when the detection value PD1OUT exceeds the reference voltage Vref, the error signal is turned to a high level.

Figure 3:
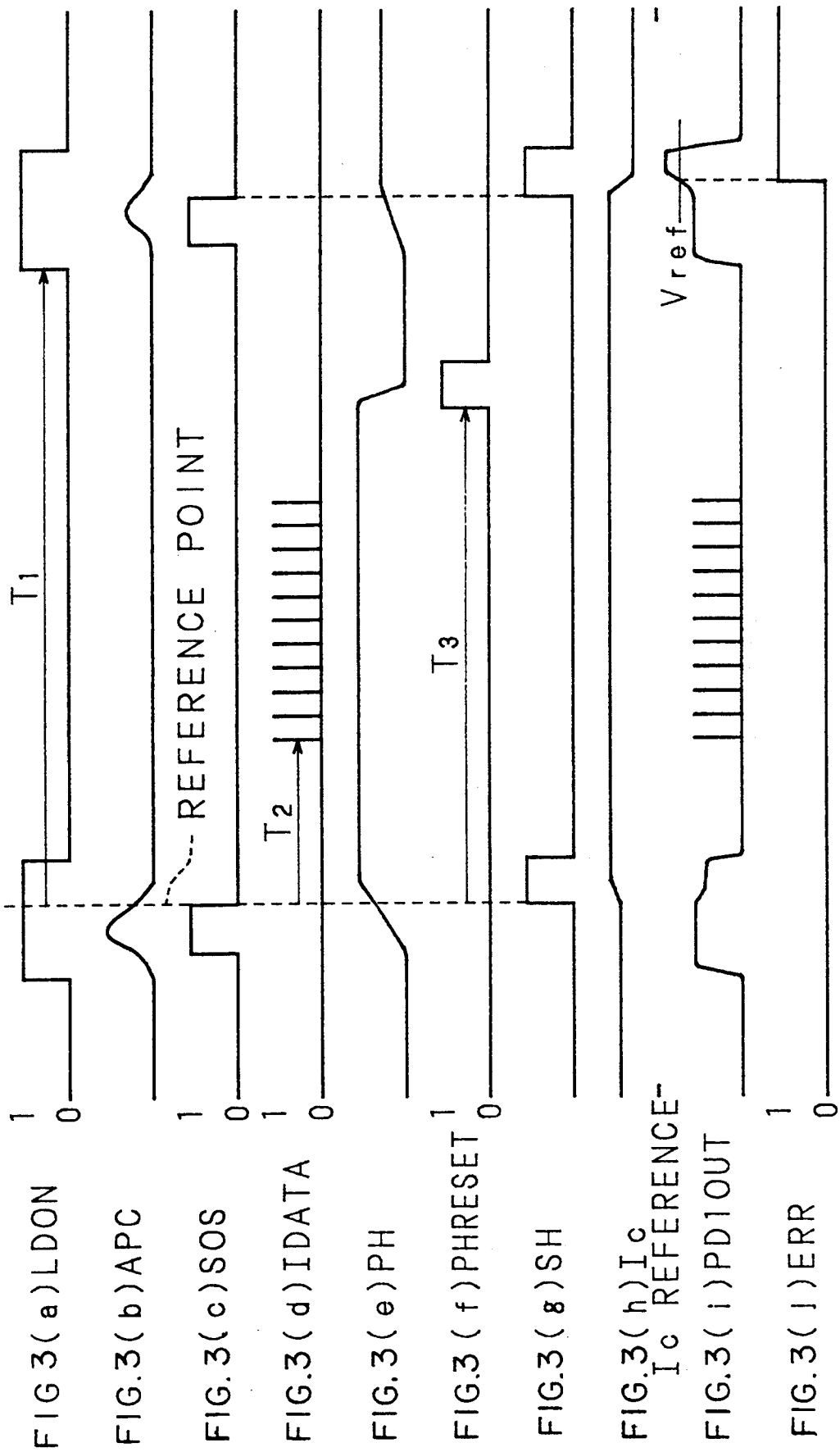
FIG. 3(a) is a timing chart of a pulse signal LDON of the laser beam scanning apparatus of this invention.
FIG. 3(b) is a timing chart of a laser beam power control signal APC of the laser beam scanning apparatus of this invention.
FIG. 3(c) is a timing chart of a synchronizing signal SOS of the laser beam scanning apparatus of this invention.
FIG. 3(d) is a timing chart of an image data signal IDATA of the laser beam scanning apparatus of this invention.
FIG. 3(e) is a timing chart of an output PH from a peak hold circuit of the laser beam scanning apparatus of this invention.
FIG. 3(f) is a timing chart of a pulse signal PHRESET of the laser beam scanning apparatus of this invention.
FIG. 3(g) is a timing chart of a pulse signal SH of the laser beam scanning apparatus of this invention.
FIG. 3(h) is a timing chart of an output Ic from a sample hold circuit of the laser beam scanning apparatus of this invention.
FIG. 3(i) is a timing chart of an output PD1OUT from a first photosensor PD1 of the laser beam scanning apparatus of this invention.
FIG. 3(j) is a timing chart of an error signal ERR of the laser beam scanning apparatus of this invention.

An operation of the printer head control circuit 2 will be discussed with reference to a timing chart of FIG. 3. After a time $T_1$ has passed from the fall of the synchronizing signal SOS, an operation signal LDON shown in FIG. 3 (a) becomes '1', namely, a high level. When the signal LDON is '1', the switching transistor 29 is turned conductive and the laser head 3 is driven by the driving current Is-Ic.

As a result, the laser beam is emitted from the semiconductor laser 3a and detected by the photosensors PD1 and PD2. The detection signal of the photosensor PD1 is outputted to the comparator 30, and that of the photosensor PD2 is sent to both the waveform shaping circuit 9 and the peak hold circuit 21. The waveform shaping circuit 9 converts the signal to the synchronizing signal SOS as shown in FIG. 3(c) and outputs the synchronizing signal SOS to the timer 22. The printing sequence of the subject line is determined on the basis of the fall of the synchronizing signal SOS.

Meanwhile, the detection signal inputted to the peak hold circuit 21 is integrated, outputted to the sample hold circuit 23, and sampled and held according to the sampling signal (SH) from the timer 22. The difference signal obtained by the subtracter 24 between the current Is from the constant current source 25 and the output current Ic from the sample hold circuit 23 is outputted to the laser head 3, whereby the laser head 3 is activated by a signal corresponding to the difference signal. For example, when the emitting intensity of the semiconductor laser 3a is too strong, the current Ic becomes large thereby to decrease the driving current Is-Ic. Accordingly, the emitting intensity weakens.

At this time, if the output PD1OUT from the photosensor PD1 is not larger than the reference voltage Vref, and if the emitting intensity is not excessive, the error signal ERR remains 0. A time $T_2$ after the synchronizing signal SOS falls, the image data IDATA is outputted to the printer head control circuit 2 from the controller 1, with repeatedly turning ON/OFF the semiconductor laser 3a in accordance with the image data IDATA as indicated in FIG. 3(d) and forming a latent image on the photosensitive drum 7.

During this time, the photosensor PD1 emits a signal approximately corresponding to the image data IDATA, as shown in FIG. 3(i). A time $T_3$ later from the fall of the synchronizing signal SOS, a peak hold reset signal PHRESET is outputted as in FIG. 3(f), thereby to reset the peak hold signal PH as represented in FIG. 3(e). The operation signal LDON becomes '1' at a time $T_1$ after the synchronizing signal SOS falls, followed by the repetition of the above series of operations.

In the meantime, as the reflecting surface 5a of the polygon mirror 5 is contaminated more, the output from the photosensor PD2 lowers, with the current Ic diminished and the driving current Is-Ic increased. If the reflecting surface 5a becomes further contaminated, the output PD1OUT from the photosensor PD1 exceeds the reference voltage Vref as indicated in FIG. 3(j), and accordingly, the error signal ERR from the comparator 30 turns to be '1'.

Consequently, the AND gate 27 is turned OFF and the switching transistor 29 is disconnected, and the driving current to the semiconductor laser 3a is shut off, thus preventing the breakage of the semiconductor laser 3a.

It may be so arranged to continue printing until the current page is completely printed when the error signal ERR turns to be '1' in the middle of the printing, by means of rounding off the driving current Is-Ic to a predetermined value.

Figure 4:
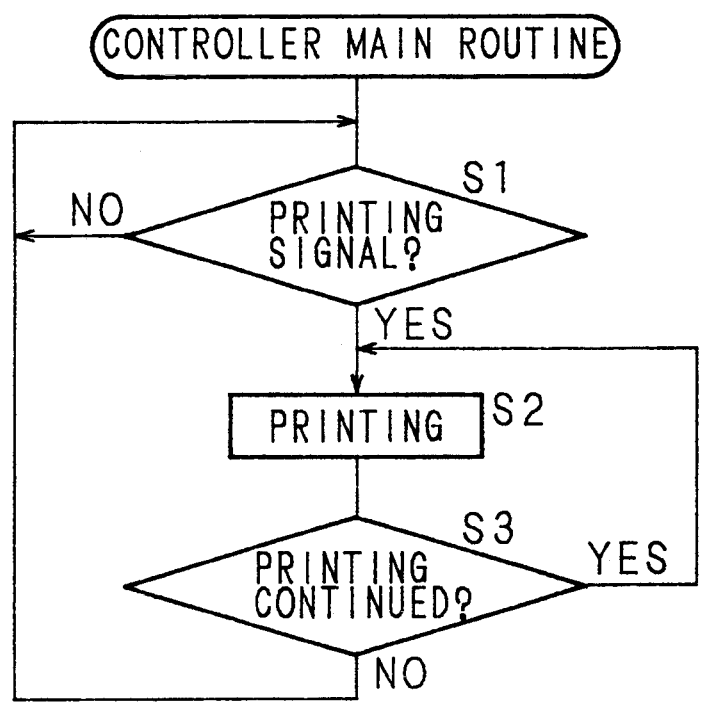
FIG. 4 is a flowchart of the processing procedure of the laser beam scanning apparatus of this invention.

FIG. 4 shows a flowchart of a main routine of the processing by the controller 1. Whether a printing signal is received is judged (step S1), and printing is executed when the printing signal is detected (step S2). In printing, a predetermined time $T_2$ is counted by the timer since the synchronizing signal is detected. When the timer counts up the time, the image data of one line is read from the image memory and sent to the printer head control circuit 2. This sequence is repeatedly performed while recording of one page is continued. Subsequently, whether the printing is continued is judged (step S3). In the case of the printing being continued, the process is returned to step S2. Otherwise, the process is started from step S1 again.

Figure 5:
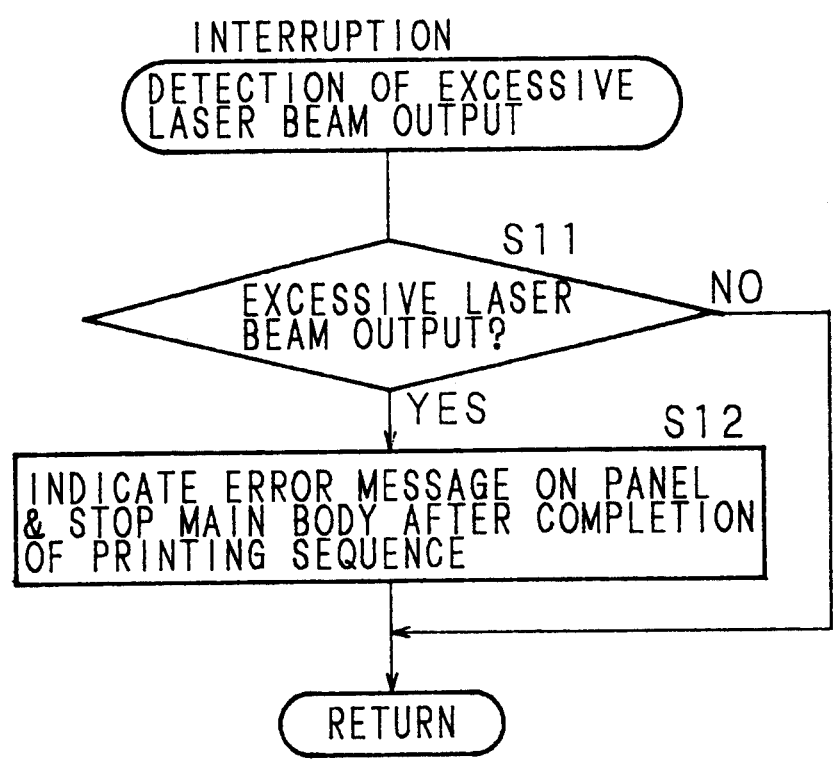
FIG. 5 is a flowchart of the processing procedure of the laser beam scanning apparatus of this invention.

FIG. 5 is a flowchart of an interruption process of the controller 1. The interruption process is carried out at predetermined intervals. Whether the output power of the laser beam is excessive is judged (step S11). When the output power of the laser beam is excessive, that is, the error signal ERR is high level, an error message is indicated on an operating panel, and the apparatus main body is stopped after the printing sequence is completed.

It is to be noted that the interruption process may be started in response to the error signal ERR.

Figure 6:
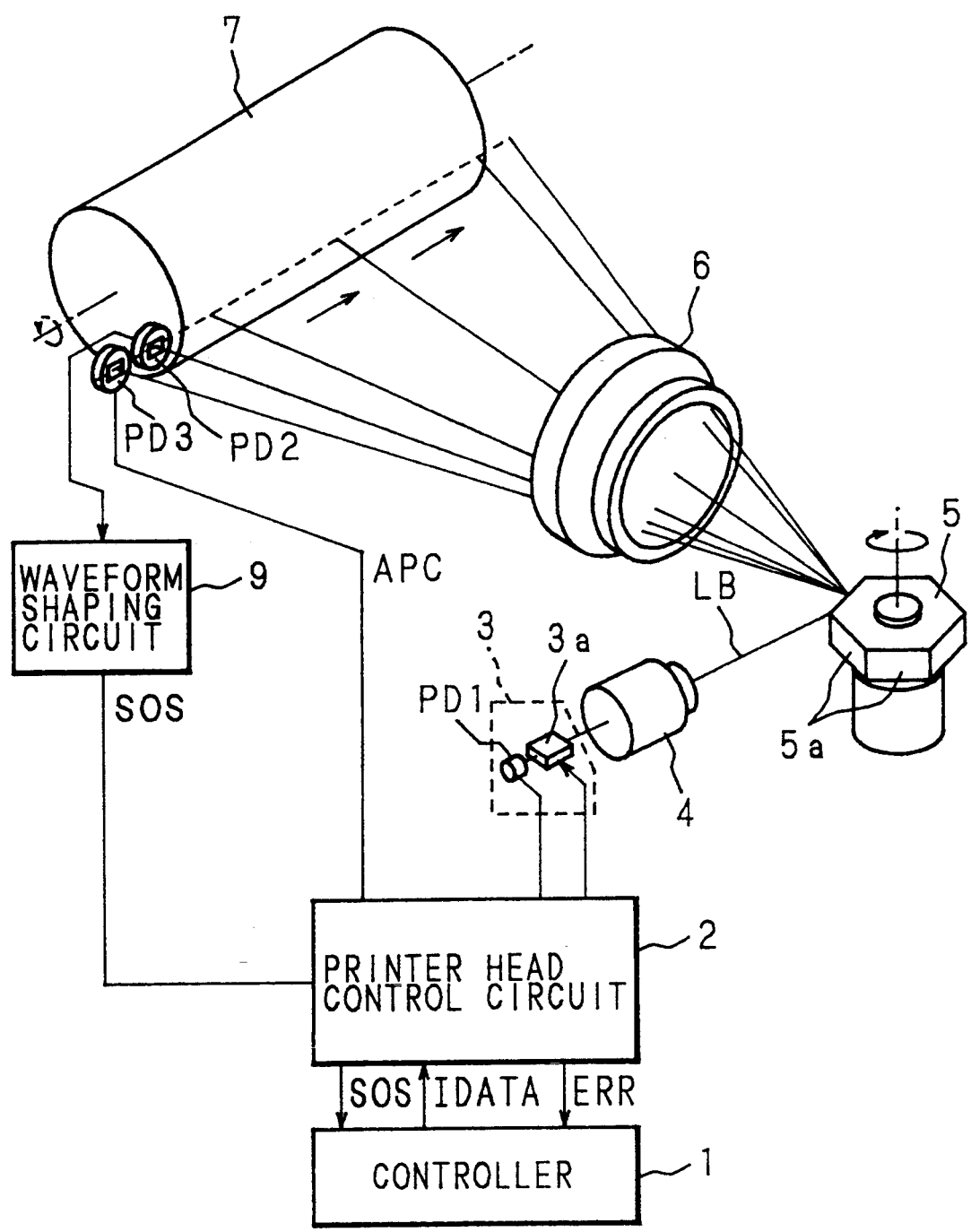
FIG. 6 is a diagram of a laser beam scanning apparatus according to a modified embodiment of this invention.

FIG. 6 illustrates a diagram of a modified laser beam scanning apparatus of this invention, in which a photosensor PD3 is arranged beside the photosensor PD2 in the upstream of the photosensitive drum 7. The photosensor PD2 is used to obtain the synchronizing signal SOS, while the latter photosensor PD3 is employed to obtain the laser beam power control signal APC. Since the other constitution and operation of the modified apparatus are substantially same as those of the embodiment shown in FIG. 1, the corresponding parts are denoted by the same reference numerals and the description will be abbreviated here.

The photosensor to output the laser beam power control signal APC is not necessarily adapted to detect the laser beam which has passed through the whole optical system. Referring to FIG. 1, for instance, the photosensor PD2 may be located at a position to receive the laser beam before it reaches the $f\theta$ lens 6 after being reflected by the polygon mirror 5.

Further, the photosensor PD1 may not always detect the laser beam directly from the semiconductor laser, but may be arranged at a position in FIG. 1 to detect the laser beam passing through the collimator lens which is scarcely contaminated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A laser beam scanning apparatus comprising:
    a laser beam emitting source for emitting a laser beam;
    an optical member disposed in an optical path of the laser beam;
    first photoreceptor means for detecting the laser beam which has passed through the optical member;
    second photoreceptor means for detecting the laser beam without it passing through the optical member;
    control means for controlling the intensity of the laser beam emitting from the laser beam emitting source, in response to the output from the first photoreceptor means; and
    trouble dealing means for dealing with troubles in the laser beam emitting source in response to an output from the second photoreceptor means if the laser beam power exceeds a predetermined value when said control means controls the intensity of said laser beam.

2. A laser beam scanning apparatus according to claim 1, wherein the laser beam emitting source includes a semiconductor laser.

3. A laser beam scanning apparatus according to claim 1, wherein the optical member includes a polygon mirror.

4. A laser beam scanning apparatus according to claim 1, wherein the optical member includes a lens.

5. A laser beam scanning apparatus according to claim 1, wherein the trouble dealing means stops the supply of power to the laser beam emitting source.

6. A laser beam scanning apparatus according to claim 1, wherein the trouble dealing means indicates an error message on a display.

7. A laser beam scanning apparatus comprising;
a semiconductor laser for emitting a laser beam from a front surface;
an optical member disposed in an optical path of the laser beam;
a first photosensor for detecting the laser beam which has passed through the optical member;
a second photosensor for detecting the laser beam emitting from a rear surface of the semiconductor laser;
control means for controlling power supplied to the semiconductor laser responsive to the output from the first photosensor so that the laser beam power at a beam receiving surface is constant; and
stopping means for stopping the supply of power to the semiconductor laser on the basis of the output from the second photosensor if the laser beam power exceeds a predetermined value when said control means controls the power supplied to the semiconductor laser.

8. A laser beam scanning apparatus according to claim 7, wherein the optical member includes a polygon mirror.

9. A laser beam scanning apparatus according to claim 7, wherein the optical member includes a lens.

10. A laser beam scanning apparatus according to claim 7, wherein the semiconductor laser and second photosensor are incorporated in one unit.

11. A laser beam scanning apparatus comprising;
a laser beam emitting source for emitting a laser beam;
modulation means for modulating the laser beam emitted from the laser beam emitting source corresponding to image data;
scanning means for scanning a beam receiving surface with the laser beam emitted from the laser beam emitting source;
first photoreceptor means for detecting the laser beam which has passed through the scanning means;
second photoreceptor means for detecting the laser beam without passing through the scanning means;
controlling means for controlling the power of the laser beam from the laser beam emitting source in response to the output from the first photoreceptor means;
modulation starting means for starting the modulation means to modulate the laser beam in accordance with the output from the first photoreceptor means; and
trouble dealing means for dealing with troubles in the laser beam emitting means on the basis of the output from the second photoreceptor means if the laser beam power exceeds a predetermined value when said control means controls the intensity of said laser beam.

12. A laser beam scanning apparatus according to claim 11, wherein the laser beam emitting source includes a semiconductor laser.

13. A laser beam scanning apparatus according to claim 11, wherein the first photoreceptor means is disposed in the vicinity of the beam receiving surface.

14. A laser beam scanning apparatus according to claim 11, wherein the scanning means includes a polygon mirror.

15. A laser beam scanning apparatus according to claim 11, wherein the trouble dealing means stops the supply of power to the laser beam emitting source.

16. A laser beam scanning means according to claim 11, wherein the trouble dealing means indicates an error message on a display.

17. In a printer for printing a predetermined unit of information, such as a page, with a scanning laser beam apparatus, the improvement comprising:
a power source;
a laser beam emitting source for emitting a laser beam upon application of power from the power source;
a photosensitive surface for receiving information from the laser beam;
means for modulating the laser beam to provide a predetermined unit of information to the photosensitive surface;
a first sensor for monitoring the intensity of the laser beam as emitted from the source and providing a corresponding first signal;
means for scanning the laser beam across the photosensitive surface;
a second sensor for monitoring the intensity of the laser beam adjacent the photosensitive surface and providing a corresponding second signal;
first means for comparing the first and second signal to adjust an intensity of the emitted laser beam;
means for providing a predetermined reference signal;
second means for comparing the predetermined reference signal with the first signal to determine if the power to the laser beam emitting source exceeds a permissible level; and
control means responsive to the second comparison means to turn off the power to the laser beam emitting source when it exceeds the permissible level but only after the means for modulating has completed a cycle of providing the predetermined unit of information to the photosensitive surface.

18. The invention of claim 17 further including a display wherein the control means provides an indication of trouble to the operator on the display.

* * * * *